(12) United States Patent
Glöckler

(10) Patent No.: US 8,047,944 B2
(45) Date of Patent: Nov. 1, 2011

(54) TRANSMISSION UNIT, IN PARTICULAR A MULTI-RANGE TRANSMISSION

(76) Inventor: Dieter Glöckler, Ulm (DE)

( * ) Notice: Subject to any disclaimer, the term of this patent is extended or adjusted under 35 U.S.C. 154(b) by 0 days.

(21) Appl. No.: 12/616,433

(22) Filed: Nov. 11, 2009

(65) Prior Publication Data

US 2010/0056318 A1 Mar. 4, 2010

Related U.S. Application Data

(63) Continuation of application No. 12/024,463, filed on Feb. 1, 2008, now abandoned, which is a continuation of application No. PCT/EP2006/007472, filed on Jul. 27, 2006.

(30) Foreign Application Priority Data

| Aug. 2, 2005 | (DE) | 10 2005 036 803 |
| Nov. 17, 2005 | (DE) | 10 2005 054 720 |

(51) Int. Cl.
*F16H 37/02* (2006.01)
(52) U.S. Cl. ............... 475/210; 475/219
(58) Field of Classification Search ............ 475/207, 475/210, 211, 218, 219; 474/72
See application file for complete search history.

(56) References Cited

U.S. PATENT DOCUMENTS

| 4,627,308 A | 12/1986 | Moroto |
| 6,561,942 B2 | 5/2003 | Wehking |
| 6,921,349 B2 | 7/2005 | Glockler |
| 6,958,029 B2 | 10/2005 | Inoue |
| 7,094,171 B2 | 8/2006 | Inoue |
| 2004/0014547 A1 | 1/2004 | Habuchi |
| 2004/0082421 A1 | 4/2004 | Wafzig |
| 2004/0266578 A1 | 12/2004 | Glockler |

FOREIGN PATENT DOCUMENTS

| DE | 887 457 | 12/1952 |
| DE | 35 43 635 A1 | 12/1985 |
| DE | 43 08 761 A1 | 3/1993 |
| DE | 195 22 385 A1 | 6/1995 |
| DE | 197 55 612 A1 | 12/1997 |
| DE | 102 04 711 A1 | 2/2002 |
| EP | 1 061 287 A2 | 12/2000 |
| WO | WO9221896 | * 10/1992 |
| WO | WO9415121 | * 7/1994 |
| WO | 2005 078314 A1 | 8/2005 |

* cited by examiner

*Primary Examiner* — Roger Pang
(74) *Attorney, Agent, or Firm* — Taylor IP, P.C.

(57) ABSTRACT

A transmission unit, especially a multirange transmission, includes two superposition gears that are embodied as triple-shaft planetary gears, a continuously variable transmission in the form of a traction gear, and a way for controlling the transmission ratio on the traction gear. The individual superposition gears and the continuously variable transmission are coupled to each other via one respective connecting gear. The second shaft of the first superposition gear and a shaft of the second superposition gear can be alternatively joined to the gear output via a shiftable clutch. The second shaft of the first superposition gear can be connected in a torsion-proof manner to the third shaft of the second superposition gear. The first shaft of the second superposition gear is joined to a shaft of the first superposition gear via another shifting clutch.

27 Claims, 4 Drawing Sheets

US 8,047,944 B2

TRANSMISSION UNIT, IN PARTICULAR A MULTI-RANGE TRANSMISSION

CROSS REFERENCE TO RELATED APPLICATIONS

This is a continuation of U.S. patent application Ser. No. 12/024,463, entitled "TRANSMISSION UNIT, IN PARTICULAR A MULTI-RANGE TRANSMISSION", filed Feb. 1, 2008, now abandoned which is incorporated herein by reference. U.S. patent application Ser. No. 12/024,463 is a continuation of PCT application No. PCT/EP2006/007472, entitled "TRANSMISSION UNIT, PARTICULARLY MULTIRANGE TRANSMISSION", filed Jul. 27, 2006, which is incorporated herein by reference.

BACKGROUND OF THE INVENTION

1. Field of the Invention

The invention relates to a transmission unit, in particular a multirange transmission.

2. Description of the Related Art

Transmission systems in the form of power distribution transmissions embodied as superposition gears are known in numerous designs. Reference is made to the following documents by way of example:

1. U.S. Pat. No. 6,921,349 B2
2. DE 197 55 612 A1
3. EP 1061 287 A2
4. DE 43 08 761 A1
5. DE 887 457 C

The design according to DE 197 55 612 A1 includes a transmission input shaft and a continuously variable step-up gear coupled to the transmission output shaft in the form of a flexible drive having an input and an output, the input being connected in a rotationally fixed manner to the transmission input shaft, a fixed gear ratio stage, and a superposition gear having a first input stage which is connected in a rotationally fixed manner to the output of the continuously variable step-up gear. In addition, a second input stage is provided which by way of a first clutch may optionally be connected to the transmission input shaft via the fixed gear ratio stage, in addition to an output stage which is coupled to the transmission output shaft in a rotationally fixed manner. On the drive side the fixed gear ratio stage is coupled in a rotationally fixed manner to the transmission input shaft, and with respect to the fixed gear ratio stage on the output side the first clutch is positioned in such a way that it optionally connects the second input stage of the superposition gear on the output side to the fixed step-up gear. A functionally reliable multirange transmission may be easily provided by way of this approach. This approach offers the advantage that in a multirange transmission produced by a combination of a continuously variable step-up gear and a geared-neutral range, high meshing speeds in the region of the first clutch may be avoided, since as a result of the fixed gear ratio stage the clutch is provided at a location after a corresponding transformation of the high rotational speed of the drive shaft to the low rotational speed. This reduces wear and increases the service life of the first clutch. However, a significant disadvantage lies in the direct connection between the continuously variable transmission, also referred to as CVT, and the transmission input and, therefore, the drive shaft. The continuously variable transmission is thus always coupled to the rotational speed of the drive motor. Load is reduced on the superposition gear in a region of high rotational speeds of the drive shaft, i.e., lower gear ratios of the continuously variable step-up gear, by providing a second clutch which optionally connects the first input stage to the output stage of the superposition gear. This establishes a rigid connection between the output shaft of the continuously variable step-up gear and the output shaft, thereby bridging the superposition gear in the torque flow. Another significant problem of power transmission via the continuously variable step-up gear is that, as a result of its dimensions, the step-up gear is able to transmit only a maximum allowable torque, since otherwise impermissible slip conditions would be observed at very high loads which would result in increased wear on the traction way. Because of the direct coupling of the continuously variable transmission to the transmission input, however, the latter is continuously exposed to these conditions. In other words, the input of the CVT is impinged on by the rotational speed at the transmission input, and therefore, by the drive motor.

A transmission unit is known from U.S. Pat. No. 6,921,349 B2 which has a structure that has been modified such that the load on the flexible drive transmission is significantly reduced, thus ensuring high power, in particular higher power than in a design according to DE 197 55 612 A1, to be transmitted via this flexible drive transmission. In this design the transmission unit is likewise embodied as a superposition gear unit. This superposition gear includes a transmission input and a transmission output, in addition to two superposition gears located between the transmission input and transmission output and connected to one another. Each of the two superposition gears is designed as a three-shaft planetary gear. Both are interconnected to form a four-shaft planetary gear. A continuously variable transmission in the form of a flexible drive transmission is connected between the first superposition gear and the second superposition gear. Each planetary gear includes a sun wheel, an internal gear, planet wheels, and a bridge. The individual shafts are formed by the sun wheel, internal gear, or bridge of the respective superposition gear. The transmission input is connected in a rotationally fixed manner to a first shaft of the first superposition gear and to a first shaft of the second superposition gear. The transmission output is connected in a rotationally fixed manner to a second shaft of the first superposition gear and to a second shaft of the second superposition gear. The coupling of the two three-shaft planetary gears to form a four-shaft planetary gear occurs by connection of the first and second shafts of the first and second superposition gears. The configuration of the continuously variable transmission in the form of a flexible drive transmission is achieved between the third shafts of the first and second superposition gears. The term "shaft" is understood in a functional sense, and includes either the individual elements of the planetary gear (sun wheel, internal gear, or bridge), or the elements connected thereto in a rotationally fixed manner, for example in the form of shafts or hollow shafts. Depending on the operating state, the individual shafts assume the function of inputs and outputs. Thus, for the transmission of power from the transmission input shaft to the transmission output shaft via the continuously variable transmission, the first superposition gear includes one input and two outputs. The input is formed by the first shaft, whereas the first output, which is at least indirectly connected to the continuously variable transmission, is formed by the third shaft, and the second output which is coupled in a rotationally fixed manner to the transmission output shaft is formed by the second shaft. In this operating state the second superposition gear includes one input and one output, the input likewise being coupled to the transmission input shaft and formed by the first shaft of the second superposition gear, and the output being formed by the second shaft. The third shaft is connected to the continuously variable transmission. In addition, a way is provided for changing the gear ratio at the transmission. One of the two superposition gears—the first or the second superposition gear—has pairs of intermeshing planetary gears between the sun wheel and the internal gear. The sun wheel and internal gear are rotatably supported on the bridge. The pairs of intermeshing planetary gears are also referred to as double-barreled planet wheels. On account of the design of the second superposition gear as a planetary gear having pairs of intermeshing planetary gears, also referred to as double-barreled planetary gears, for a portion of the overall operating range it is ensured that the CVT operates at maximum rotational speed, whereby a change may also be made with regard to the gear ratio at the individual disks at maximum engine speed; i.e., rotation above the zero level is possible, thus enabling a geared-neutral state as well as a change in rotational direction to be achieved by the transmission according to the invention. The double-barreled design offers the advantage that for an increased rotational speed thus produced at the output coupled to the continuously variable transmission, in particular the internal gear of this planetary gear, a reduction at the output of the other respective planetary gear, in particular the internal gear, which is coupled to the continuously variable transmission is achieved corresponding to the design of the other planetary gear. According to this design, however, it is not possible to allow the continuously variable transmission to operate multiple times over the entire operating range at maximum rotational speed.

A multirange transmission is known from EP 1 061 287 A2. This multirange transmission is characterized by a three-shaft planetary gear which may be connected to the transmission output via a continuously variable transmission. Three-shaft planetary gears are always traversed in parallel, the coupling to the transmission output being achieved by way of different gear ratios, which in this case are implemented via spur gear stages which may be respectively coupled to the transmission output via individual clutch units. In other words, only one gear ratio stage, which is fixed, is provided downstream from the continuously variable transmission. As a result, however, the continuously variable step-up gear is consistently varied via a fixed gear ratio. Depending on the output gear ratio selected, this results in individual maximum allowable gear ratio ranges. This also applies analogously to the design described in DE 887 457 and DE 43 08 761.

What is needed in the art is a multirange transmission which, in addition to the advantages achieved by the transmission configurations previously described, provides an improved transmission configuration, whereby in particular operation above the zero level is possible. What is also needed is to reduce the load on the flexible drive transmission during operation. What is further needed is a design having the improved transmission configuration, described on the basis of U.S. Pat. No. 6,921,349 B2, which overcomes the referenced disadvantages from the prior art.

SUMMARY OF THE INVENTION

The present invention provides that the transmission unit is designed as a multirange transmission. This multirange transmission includes a transmission input and a transmission output, in addition to two interconnected superposition gears located between the transmission input and transmission output. Each of the two superposition gears is designed as a three-shaft planetary gear. A continuously variable transmission in the form of a flexible drive transmission is connected between the first superposition gear and the second superposition gear. Each planetary gear includes a sun wheel, an internal gear, planet wheels, and a bridge. The individual shafts are formed by the sun wheel, internal gear, or bridge of the respective superposition gear, or by an element connected thereto in a rotationally fixed manner. The transmission input is connected at least indirectly, i.e., directly or indirectly via additional transmitting elements, in a rotationally fixed manner to a first shaft of the first superposition gear. According to the invention, a shiftable clutch is provided between the first shaft of the second superposition gear and a shaft of the first superposition gear. The transmission output is connected in a rotationally fixed manner to a second shaft of the second superposition gear, and may be connected in a rotationally fixed manner to a second shaft of the first superposition gear via an additional shiftable clutch. The configuration of the continuously variable transmission in the form of a flexible drive transmission is achieved between the third shafts of the first and second superposition gears. The term "shaft" is understood in a functional sense, and includes either the individual elements of the planetary gear (sun wheel, internal gear, or bridge), or the elements connected thereto in a rotationally fixed manner, for example in the form of shafts or hollow shafts.

Depending on the operating range, the individual shafts assume the function of inputs and outputs. Thus, for the transmission of power from the transmission input shaft to the transmission output shaft via the continuously variable transmission, the first superposition gear includes one input and two outputs. The input is formed by the first shaft, whereas the first output, which is at least indirectly connected to the continuously variable transmission, is formed by the second shaft, and the third output which is coupled in a rotationally fixed manner to the transmission output shaft is formed by the third shaft. In this operating state the second superposition gear includes one input and one output, the input being coupled to the third shaft of the first superposition gear and being formed by the first shaft of the second superposition gear, and the output being formed by the second shaft. The third shaft is connected to the continuously variable transmission. In addition, a way is provided for changing the gear ratio at the transmission.

The coupling between the superposition gears and the continuously variable transmission is achieved in each case via a connecting gear in the form of gear ratio stages. In the simplest case this is achieved by way of a simple spur gear set having an even number of spur gears, in which case the respective input spur gear may be formed directly by the output of the superposition gear. Both clutches are shiftable, and as a rule power is transmitted by first shifting the first clutch, and with synchronism between the first shaft of the second superposition gear and the third shaft of the second superposition gear, or the second shaft of the first superposition gear, by shifting the second clutch and releasing the first clutch. Depending on the clutch design, the clutches may also be engaged in an overlapping or consecutive manner. However, this is preferably performed without interruption of tensile force, and the second clutch is shifted with synchronism between the second and third shafts of the superposition gear. For this design as well, the input of the continuously variable transmission in the form of the flexible drive transmission is not bound to the rotational speed of the drive motor; i.e., there is no rotationally fixed connection between the input of the transmission unit and the continuously variable transmission. This is achieved solely via the first superposition gear. Since by necessity one of the shafts of the first superposition gear is not fixed, the first superposition gear does not specify a fixed gear ratio. The continuously variable transmission operates over the entire operating range at maximum rotational speed at maximum engine speed. On account of the two shiftable clutches and their alternating actuation, resulting in bridging of the second superposition gear, over the entire operating range the continuously variable transmission changes twice, in a manner of speaking, with regard to the rotational speed, for example in a range of 2000 to 4800 rpm.

The key factor is that the alternation of clutches for the second planetary gear takes place without interruption of tensile force. The transmission input shaft and the third shaft of the second superposition gear, or the second shaft of the first superposition gear, run synchronously.

The approach according to the invention is characterized in that in all operating ranges there is no direct, rotationally fixed coupling between the transmission input shaft and the continuously variable transmission, in particular the respective disk system which functions as the input of the continuously variable transmission; instead, this coupling is achieved via a superposition gear. Thus, although a fixed gear ratio is achieved over a stage due to the coupling between the superposition gear and the continuously variable transmission, the individual variables of rotational speed and torque at the input of the continuously variable transmission are always a function of the conditions at the first superposition gear; i.e., when power is transmitted via the flexible drive transmission the greatest influence is on the rotational speed at the transmission output shaft, which in turn exerts influence on the first superposition gear and thus affects the amount of power that can be transmitted via the first superposition gear, as well as the rotational speed of the third shaft of the first superposition gear. As a result, unnecessarily high loads on the continuously variable transmission are avoided at higher rotational speeds. The input of the continuously variable transmission is therefore no longer directly bound to the rotational speed at the transmission input, and thus to the drive motor coupled thereto. The rotational speed at the transmission output of the transmission unit may be modified by control of the continuously variable transmission. Due to the capability for shifting the two clutches, a multirange transmission is realized which is characterized by utilization of the gear ratio range of the continuously variable transmission in each of the individual operating ranges. In other words, the continuously variable transmission is traversed in both directions in each operating range. The overall spread of the transmission is thus increased for a flexible drive transmission of the same or smaller dimension.

Depending on the assignment of the functions of the individual shafts to the elements of the individual superposition gears, systems may be produced having an eccentric configuration of transmission input with respect to transmission output, or a coaxial configuration.

According to a first design, the first shafts of the two superposition gears are each formed by the bridge for the individual superposition gear. The second shaft of the first planetary gear is formed by the sun wheel, and the second shaft of the second planetary gear is formed by the internal gear. The third shafts, which are at least indirectly coupled to the flexible drive transmission, are formed by the internal gear of the first planetary gear and the sun wheel of the second planetary gear.

According to a second approach, the multirange transmission includes a transmission input and a transmission output, between which a continuously variable transmission, a first three-shaft planetary gear, and a second three-shaft planetary gear are provided. The continuously variable transmission and the planetary gear are configured in parallel. The first three-shaft planetary gear is designed as a superposition gear including a sun wheel, internal gear, bridge, and double planet wheel sets between the internal gear and sun wheel, the individual shafts each being formed by the sun wheel, internal gear, or bridge, or by the elements which are respectively connected thereto in a rotationally fixed manner. A first shaft is at least indirectly coupled in a rotationally fixed manner to the transmission input. The second shaft and the third shaft are at least indirectly coupled in a rotationally fixed manner to an input or output of the continuously variable transmission, which is present in the form of a flexible drive transmission. A shiftable clutch is provided directly between the second shaft of the first superposition gear and the second shaft of the second superposition gear. An additional shiftable clutch is provided between the first shaft of the second superposition gear and the third shaft of the first superposition gear. The second superposition gear is situated downstream from the first superposition gear, and may be coupled thereto by way of clutch units. The second superposition gear is likewise designed as a three-shaft gear including a third shaft which is connected in a rotationally fixed manner to the second shaft of the first planetary gear, a second shaft which is connected in a rotationally fixed manner to the transmission output and which may be connected in a rotationally fixed manner to the second shaft of the first planetary gear via the second shiftable clutch, and a first shaft which may be connected in a rotationally fixed manner to the third shaft of the first planetary gear via a first shiftable clutch unit.

The two shiftable clutches may be selectively shifted, i.e., individually or together. The shifting may also be performed in an overlapping manner. The shiftable clutches are designed as clutches which may be operated with slip, or as synchronously shiftable clutches. Depending on the operating range, the individual shafts assume the function of inputs and outputs.

According to the invention, in one embodiment corresponding to the second approach the first shaft of the first planetary gear is formed by the internal gear, the second shaft is formed by the sun wheel, and the third shaft is formed by the bridge. The third shaft of the second superposition gear is formed by the sun wheel, the first shaft is formed by the bridge, and the second shaft is formed by the internal gear. When the additional shiftable clutch between the first shaft of the second planetary gear and the third shaft of the first planetary gear is actuated, the two planetary gears are connected to form a four-shaft planetary gear; i.e., the gear ratio present at the output of the first planetary gear is transformed once again at the transmission output. When the other shiftable clutch is actuated, there is synchronism between the first shaft and the third shaft of the second superposition gear, thereby achieving a gear ratio of 1:1.

The internal gear and sun wheel for the two planet wheel sets may be designed in any given manner. However, the overall design, in particular the connection between the outputs and the continuously variable transmission, must be taken into account. The overall spread of the transmission may be influenced by the design of the second superposition gear. For example, the overall spread of the transmission may be directly influenced by varying the sun wheel, in particular its diameter, while maintaining the design of the internal gear. Enlarging the diameter increases the overall spread, while decreasing the diameter reduces the overall spread. The first planet wheel set is designed as a function of the spread of the CVT; i.e., the internal gear and sun wheel are designed according to an embodiment corresponding to the first approach, for example with a CVT spread to be achieved that is approximately 2.5, in such a way that the ratio of the sun wheel to the internal gear corresponds to the ratios achieved with the CVT. (The shafts run synchronously during alternation of the clutches.)

The continuously variable transmission may have numerous designs for both approaches, and is preferably designed as a positive-fit flexible drive transmission. The flexible drive transmission includes two disk systems, a first disk system and a second disk system, whereby the individual disks, preferably at least one disk, are displaceable relative to one another for changing the gear ratio. Belts, chains, and push belts are used as traction way.

For the design of the flexible drive transmission having two disk systems, wherein the distance between the disks of a disk system may be varied by way of the pressure force on the disks of a disk system, and this variable is used as a direct control variable or a variable which at least indirectly characterizes same, the way for controlling the gear ratio includes corresponding actuating devices for impinging on the individual disks or displacing same. The disks may be operated by electrohydraulic ways, for example. It is possible for a corresponding actuating device to be associated with only one disk system for actively changing the operating radius for the traction way, while associated with the other disk system are pretensioned spring units, for example, which, depending on the change in the distance between the individual disks, and thus of the operating radius, at the disk system which may be actively controlled by the actuating device, allow the pressure force to be automatically adjusted and therefore the operating radius to be set. Another possibility is to actuate both disk systems. With regard to the specific design there are a number of possibilities known from the prior art, which therefore will not be discussed in greater detail.

The gear ratio stages provided between the first and second superposition gears and the continuously variable transmission (CVT) are designed according to the maximum allowable rotational speed at the CVT.

For the approach according to the invention, a control is also provided which modifies the gear ratio on the flexible drive transmission, in particular by changing the distance between the disks of a disk system. This is achieved, for example, as a function of the engine speed, the desired rotational speed at the transmission output shaft, the position of the gas pedal, and other influencing variables. There are a number of possibilities for the control, for which conventional approaches may be used.

For reversing the direction of rotation, a reversing gear or a corresponding system may also be provided which allows the rotational direction of the transmission input shaft to be reversed. However, it is also possible to make full use of the spread range and operate the second superposition gear above the zero level.

In addition, a starter unit as previously described, for example in the form of a hydrodynamic converter, a hydrodynamic clutch, or a mechanical clutch, for example in the form of a wet-running multi-plate clutch, may be associated with the transmission unit according to the invention so as not to transmit the full load to the continuously variable transmission in the start-up state.

According to one particularly advantageous refinement, slip resulting at the continuously variable transmission at high power may be prevented by use of a way for adapting the rotational speed of the traction way to the rotational speed of the drive shaft. A further increase in the amount of transmittable power may thus be achieved.

The way for adapting the rotational speed of the traction way to the rotational speed of the transmission input includes a transmitting element which is at least indirectly coupled to the transmission input and mechanically linked to the traction way in a positive-fit manner. The traction way is provided with circumferential profiling at the outer periphery which engages with correspondingly designed profiling at the outer periphery of the transmitting element. Another possibility is to design the traction way as a chain or as a combination of a belt and chain, in which case the transmitting element is designed as a sprocket wheel; i.e., the design consistently results from the unchanged positioning of the transmitting element relative to the traction way. According to a first approach, adjustments to the traction way upon changes in the operating radii when the disks of the continuously variable transmission are displaced and the rotational speed of the traction way is synchronously adapted to the rotational speed of the transmission input are compensated for by use of a clamping device, in particular a tensioning roller. The tensioning roller may be swiveled relative to the traction way and stationarily supported. The transmitting element is at least indirectly coupled to the transmission input. This means that the transmitting element is either coupled in a rotationally fixed manner to the transmission input or is coupled thereto via additional transmitting elements. To ensure rotation of the transmitting element in the same rotational direction as the operating direction of the traction way, the traction way is either directly coupled in a rotationally fixed manner to the drive shaft or transmission input, or is coupled via additional transmitting elements such as a spur gear set, in which case the number of intermeshing transmitting elements is odd. The transmitting elements may also be provided so as to be pivotable relative to the traction way. The transmitting elements are then used simultaneously as a clamping element for adapting the rotational speed to the rotational speed at the transmission input. The gearwheel prevents slip on the smaller operating radius of the flexible drive transmission. The torque is transmitted over large and small operating radii, thus achieving a larger transmitting surface.

According to a further approach, for taut and slip-free guiding of the traction way the deviations from the peripheral length of the traction way theoretically required in this state for secure transmission of torque, resulting from differing displacement of the two disk systems, i.e., nonuniform displacement, are compensated for by the capability of the disk systems to swivel about the transmitting element. The elements on the shafts connected in a rotationally fixed manner to the disk systems and the elements supported thereon—the output of the first fixed gear ratio stage and the input of the second fixed gear ratio stage—are also swiveled. These elements specify the swivel radius. The swiveling always occurs in the circumferential direction, i.e., about the transmitting element.

Operation above the zero level is possible for certain designs of the transmission. Otherwise, reverse shifting is provided for reversing the rotational direction.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
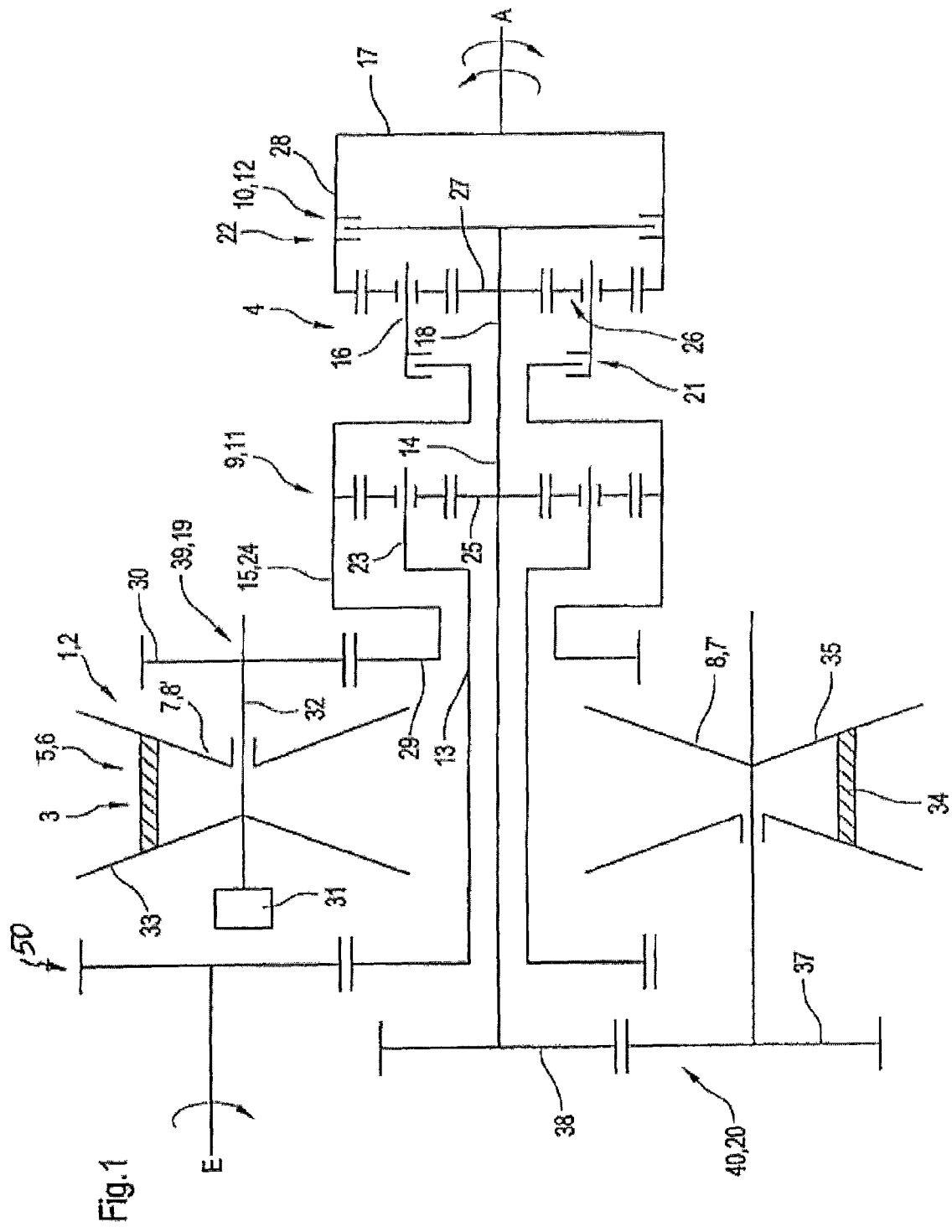
FIG. 1 shows one design of a transmission unit according to the present invention.

Referring now to the drawings, and more particularly to FIG. 1, there is shown a schematically simplified illustration of the basic design of a transmission unit 1 configured according to the invention in the form of a superposition gear unit, in particular in the form of a multirange transmission 2. The transmission unit includes a transmission input E and a transmission output A. The transmission input E and transmission output A have an eccentric configuration. The offset is achieved by way of an intermediate gear stage 50. The transmission input E is at least indirectly connected to a drive motor, whereas for use in vehicles the output may be indirectly coupled in a rotationally fixed manner to the wheels of the vehicle to be driven. Power transmission between transmission input E and transmission output A occurs in the individual operating ranges, preferably at least two operating ranges, which in each case make use of two power branches, a first power branch 3 and a second power branch 4. According to the invention, a continuously variable transmission 5 in the form of a flexible drive transmission 6 is provided in the first power branch 3, whereby the input 7 of the continuously variable transmission 5 which functions as an input in at least one operating range is free of a direct coupling with transmission input E, and is thus free of coupling with the drive motor. In particular, a fixed gear ratio is not provided between transmission input E and the continuously variable transmission 5. The respective output 8 of the continuously variable transmission 5 is free of a direct coupling with transmission output A. For this purpose two superposition gears 9 and 10 are provided between transmission input E and transmission output A. The two superposition gears—first superposition gear 9 and second superposition gear 10—are designed as three-shaft planetary gears 11 and 12. Each planetary gear—a planetary gear 11 which forms a first superposition gear 9 and the planetary gear 12 which forms the second superposition gear 10—each include a first shaft, a second shaft, and a third shaft. For the first planetary gear 11 the first shaft is denoted by reference numeral 13, the second shaft by 14, and the third shaft by 15, whereas for the second planetary gear 12 the first shaft is denoted by 16, the second shaft by 17, and the third shaft by 18. The first shaft 13 of the first planetary gear 11 is connected in a rotationally fixed manner to input E of the transmission unit 1 or is formed by same. The second shaft 14 may be connected to the second planetary gear 12, and the third shaft 15 may be connected at least indirectly to the continuously variable transmission 5, preferably via a connecting gear 39 which includes a gear ratio stage 19. This applies analogously to the second superposition gear 10 in the form of the second planetary gear 12. The first shaft 16 is connected to the first planet wheel set 11, in particular to the third shaft 15, the coupling with transmission unit E occurring via this connection. The third shaft 18 may be connected in a rotationally fixed manner to the second shaft 14 of the first planetary gear 11 and may be connected at least indirectly to the continuously variable transmission 5. The connection is made via a connecting gear 40 which includes a gear ratio stage 20. Gear ratio stages 19 and 20 have a fixed gear ratio. The second shaft 17 is connected in a rotationally fixed manner to output A of the transmission unit 1. According to the invention, the first superposition gear 9 and the second superposition gear 10 are alternately used in the individual operating ranges as power dividers and summing gears. To achieve the multirange operating method, two shiftable clutches 21 and 22 are associated with the second superposition gear 10 which optionally connect the first shaft 16 to input E of the transmission unit 1 or to the third shaft of the first superposition gear 9, and a second shiftable clutch 22 optionally connects the third shaft 18 to output A of the transmission unit 1 and thus connects output A to the continuously variable transmission 5 via the second gear ratio stage 20. The individual functions of the first shaft, second shaft, and third shaft of the individual planetary gears 11, 12 are provided for the first planetary gear 11 by a bridge 23 as the first shaft, and the function of the second shaft 14 for connecting to the second superposition gear 10 and via the latter to output A is provided by the sun wheel 25. The third shaft 15 is formed by the internal gear 24. The function of the first shaft 16 of the second superposition gear 10 is provided by the bridge 26, that of the second shaft 17 is provided by the internal gear 28, and that of the third shaft 18 is provided by the sun wheel 27. The first shiftable clutch 21 serves as the connection between the bridge 26 of the second superposition gear 10 and the first superposition gear 9, whereas the second shiftable clutch 22 serves as the connection between the continuously variable transmission 5, in particular the second gear ratio stage 20, and output A of the transmission unit 1. The continuously variable transmission is designed as a flexible drive transmission 6. The flexible drive transmission includes two disk systems 33 and 35 connected by traction way 34. Depending on the direction of power transmission, the first or second disk system 33, 35 functions as an input or an output of the continuously variable transmission 5. The method of functioning is designed as follows, in which at least two operating ranges may be achieved.

The first clutch 21 is engaged in a first operating range. In this case there is a direct connection between the first superposition gear 9 and the first shaft 16 of the second superposition gear 10. In this case the first superposition gear 9 functions as a power divider and the second superposition gear 10 functions strictly as a summing gear. The power flow is conducted via the first shaft 16 of the second superposition gear 10, the effect via the first superposition gear 9 specifying the rotational speed at output A of the transmission unit via the third shaft 15 of the first planetary gear 11. By use of this approach the advantageous characteristics of the system referenced in U.S. Pat. No. 6,921,349 B2 may be maintained, and in addition the load on the flexible drive transmission 6 may be reduced. Although a fixed gear ratio is achieved over one stage 19 due to the coupling between the superposition gear 9 and the continuously variable transmission 5, the individual variables of rotational speed and torque at the continuously variable transmission 5 are always a function of the conditions at the first superposition gear 9 and the shifting of the individual clutches 21, 22. Power is transmitted via the first planetary gear 11, in particular the sun wheel 25, to the flexible drive transmission 6, in particular the disk system 35, which in this operating state functions as an input 7', and via the disk system to the hollow shaft 24, and is combined at the second planetary gear 12. As a result, unnecessarily high loads on the continuously variable transmission 5 at higher rotational speeds are avoided. The input of the continuously variable transmission 5 is thus no longer directly coupled to the rotational speed of the drive motor. The rotational speed at the output may be modified by controlling the continuously variable transmission 5. The respective couplings between the individual disk systems 33, 35 of the continuously variable transmission 5 and the superposition gears 9, 10 are achieved via the corresponding connecting gears 39, 40 with fixed gear ratio stages 19, 20. For designs of the flexible drive transmission 6 having two disk systems 33, 35, wherein the distance between the disks of a disk system 33, 35 may be varied by way of the pressure force on the disks of a disk system, and this variable is used as a direct control variable or a variable which at least indirectly characterizes same, the way 31 for controlling the gear ratios at disk systems 33, 35 includes a corresponding actuating device for varying the pressure force, i.e., an actuating device for impinging on the individual disks or displacing same. The disks may be operated by electrohydraulic ways, for example. It is possible for a corresponding actuating device to be associated with only one disk system 33, 35 for actively changing the operating radius for the traction way, while associated with the other disk system 33 or 35 are pretensioned spring units, for example, which, depending on the change in the distance between the individual disks, and thus of the operating radius, at the disk system 33 or 35 which may be actively controlled by the actuating device, allow the pressure force to be automatically adjusted and therefore allow the operating radius to be set. Another possibility is to actuate both disk systems, in this case disk systems 33 and 35. With regard to the specific design there are a number of possibilities well known from the prior art, which therefore will not be discussed in greater detail. This also applies to the actuation methods themselves as well as specification of the control, regulation, and reference variables for operation of the flexible drive transmission, as well as incorporation of same into existing drive designs. There are numerous possibilities for the design of the continuously variable transmission 5. The coupling of the two disk systems 33 and 35 and the transmission of force occur in each case via traction way 34, for example in the form of a belt, chain, or push belt.

In a second operating range II the first clutch 21 between the continuously variable transmission and transmission output A is disengaged, and the second clutch 22 is engaged. In this case there is a rotationally fixed connection between transmission output A and the third shaft 18 of the second superposition gear 10, and thus with the output of the fixed gear ratio stage 20, which in turn is connected to the second shaft 14 of the first superposition gear 9. The internal gear 28 and sun wheel 27 of the second superposition gear 10 are interconnected in a rotationally fixed manner. The gear ratio range of the continuously variable transmission 5 is thus used once again to achieve a higher transmission spread, thereby reducing the load on the continuously variable transmission. Power is transmitted from transmission input E via the first superposition gear 9 and the first gear ratio step 19 to the continuously variable transmission 5. In the illustrated case the first gear ratio stage 19 is designed as a spur gear stage, the first spur gear 29 being formed by the internal gear 24 of the first superposition gear 9, whereas the second spur gear 30 which meshes therewith is connected to the shaft 32 which in this functional state acts as an input 7 of the continuously variable transmission, or is connected to an element of the continuously variable transmission 5 which is connected in a rotationally fixed manner to the first disk system 33. Power is transmitted via the traction way 34 to a second disk system 35, which in turn is connected via the second gear ratio stage 20, in the form of a spur gear set 36, to the third shaft 18 of the superposition gear 10. Here as well, the spur gear set 36 includes two spur gears, the first spur gear 37 being connected to the second disk system 35 and the second spur gear 38 being connected to the third shaft 18 of the second superposition gear 10. In this functional state as well, the distance between the disks of the first and second disk systems 33 and 35 is adjusted in each case to achieve the desired gear ratios.

As a result of the coupling between the sun wheel and the internal gear 27 and 28, respectively, the second superposition gear 10 operates at a gear ratio of 1:1. In this operating range the gear ratio of the overall transmission is specified primarily by the continuously variable transmission 5. This results in a change in the gear ratio at the continuously variable transmission corresponding to the actuation of the individual disk systems. Here as well, use is made of the possible operating range of the continuously variable transmission by appropriate displacement of the disks. This occurs in each case by gearing up and then gearing down, starting, for example, with the disk system coupled to the first superposition gear.

The transmission 1 may be coupled to the drive or the drive motor via a starter unit.

The first superposition gear 9 and the second superposition gear 10, as previously described, are designed as planetary gear transmissions in the form of planetary gears 11 and 12. Each planetary gear includes at least a sun wheel 25, an internal gear 24, a bridge 23, and planet wheels. The sun wheel 25 and the internal gear 24 are connected to one another via simple planet wheels. This also applies analogously to the second planetary gear 12.

Figure 2:
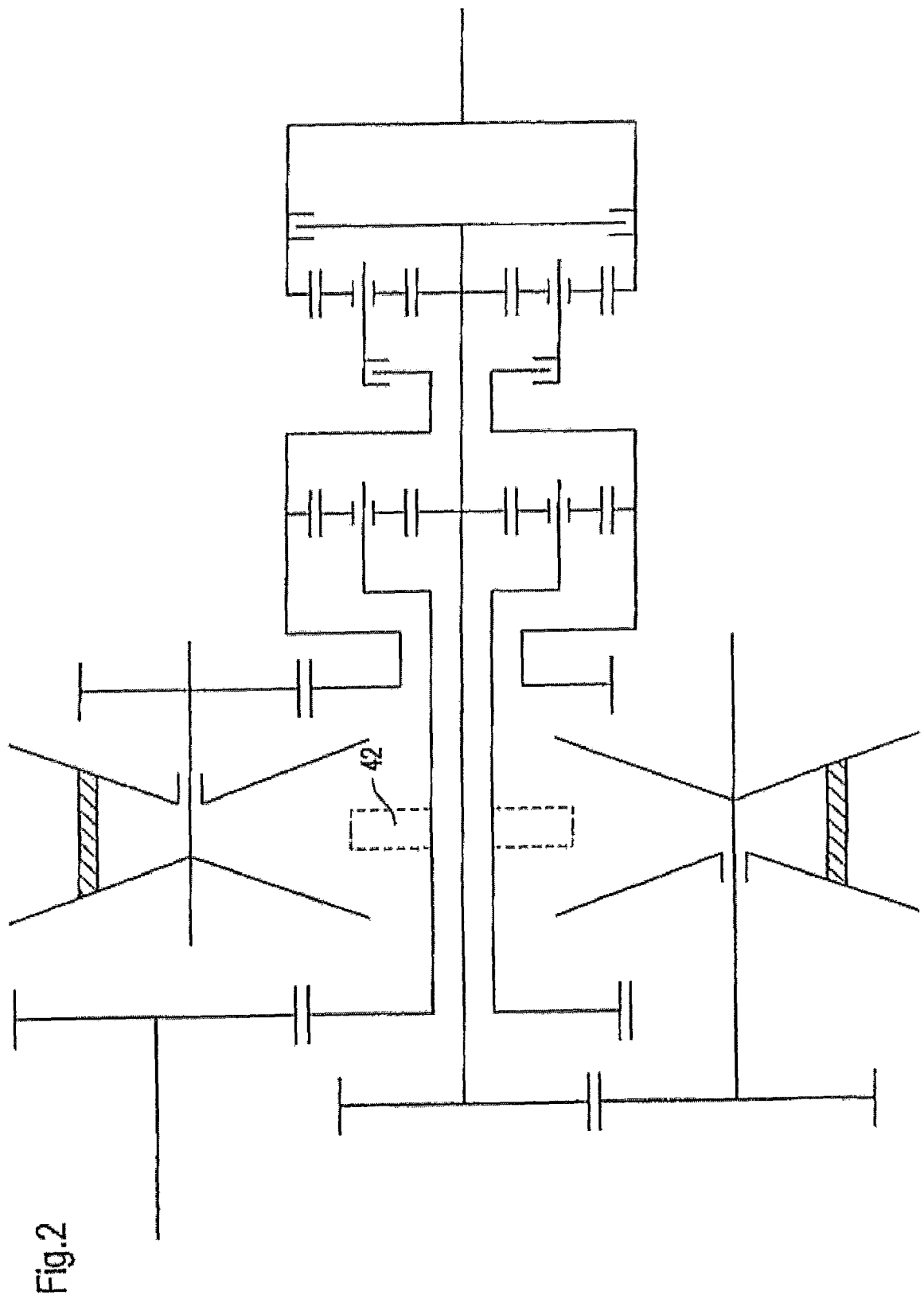
FIG. 2 shows an advantageous refinement according to FIG. 1.

With reference to an embodiment according to FIG. 1, FIG. 2 shows a particularly advantageous refinement of the transmission unit 1 designed according to the invention in the form of a multirange transmission 2 for achieving the transmission of high torques. The basic design corresponds to that described in FIG. 1, for which reason the same reference numerals are used for identical elements. The continuously variable transmission 5 is likewise designed as a positive-fit flexible drive transmission 6. According to the invention, the traction way 34 is provided with profiling at the outer periphery which allows a transmitting element 42, which is at least indirectly coupled in a rotationally fixed manner to transmission input E, to engage with correspondingly designed profiling, thus allowing synchronous adaptation of the rotational speed of the traction way 34 to transmission input E at any given gear ratio between transmission input E and transmission output A. This measure offers the advantage that, for the same dimensions of the flexible drive transmission, a multiple of the power, for example approximately three times more power, may be transmitted than in the absence of this measure, and slip conditions at the flexible drive transmission are avoided. Gearwheels or sprocket wheels are used as the transmitting element 42, depending on the choice of traction way. The changes in drum length (or operating radius) are compensated for by way of a clamping device (not illustrated here), such as a tensioning roller. The gearwheel prevents slip on the small operating radius of the CVT. Both disk systems transmit torques (large and small operating radius).

Figure 4:
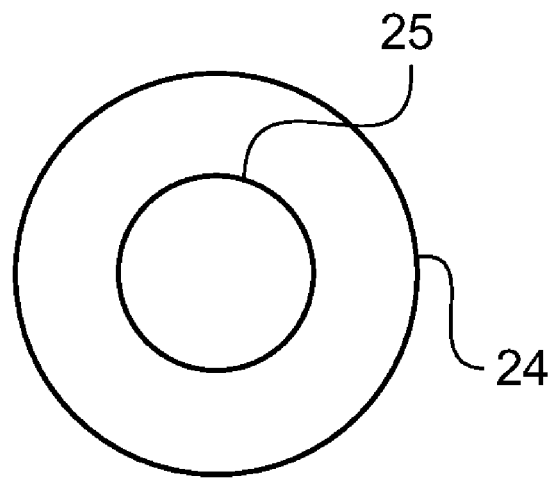
FIG. 4 shows schematically the reference circles of the sun wheel and the internal gear of the first superposition gear.
Figure 5:
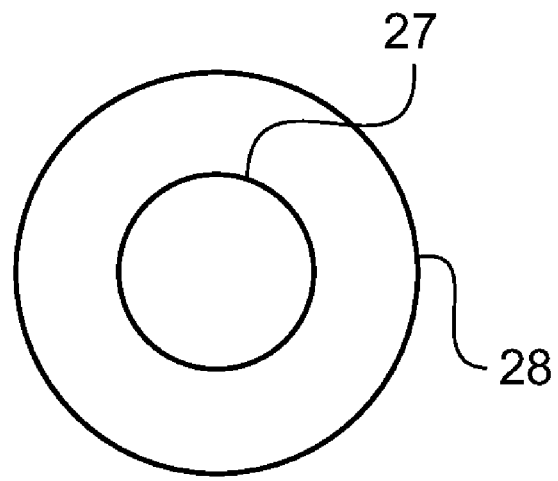
FIG. 5 shows schematically the reference circles of the sun wheel and the internal gear of the second superposition gear.

FIG. 4 schematically shows the reference circles of the sun wheel 25 and the internal gear 24 of the first superposition gear 9. FIG. 5 schematically shows the reference circles of the sun wheel 27 and the internal gear 28 of the second superposition gear 10.

Figure 3:
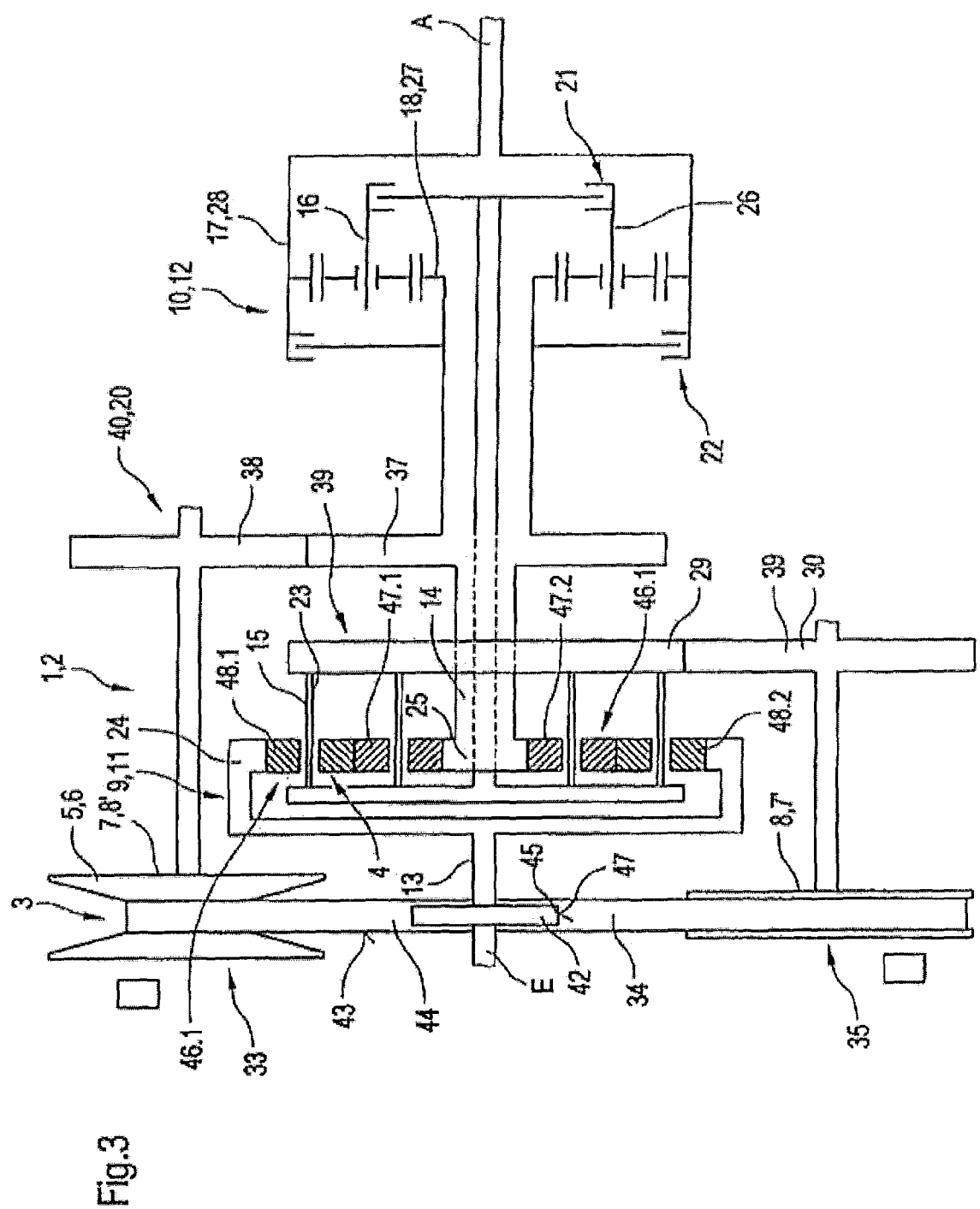
FIG. 3 shows one particularly advantageous design of an approach according to the present invention in a coaxial design.

FIG. 3 shows a schematically simplified illustration of the basic design of a transmission unit 1 configured in a particularly advantageous manner according to the invention in the form of a superposition gear unit, in particular a multirange transmission 2, by way of which operation above the zero level is also possible, and which is characterized by a coaxial configuration of transmission input E, transmission output A, and superposition gears 9, 10. Transmission input E is at least indirectly connected to a drive motor, whereas for use in vehicles transmission output A may be at least indirectly coupled to the wheels of the vehicle to be driven. Power transmission between transmission input E and transmission output A occurs in the individual operating ranges, which in each case make use of two power branches, a first power branch 3 and a second power branch 4. For this purpose the transmission unit 1 also includes a continuously variable transmission 5 in the form of a flexible drive transmission 6. This flexible drive transmission in each case includes an input 7 and an output 8, the terms "input" and "output" being understood in a functional sense and being free of a direct coupling with transmission input E, and thus free of a coupling with the drive motor. Thus, over the entire operating range no fixed gear ratio is provided between transmission input E and the continuously variable transmission 5. The output 8 of the continuously variable transmission is likewise free of a direct coupling with transmission output A. To this end a superposition gear 9 is provided between transmission input E and transmission output A. This superposition gear is designed as a three-shaft planetary gear 11. The three-shaft planetary gear includes a first shaft 13, a second shaft 14, and a third shaft 15. The first shaft 13 is at least indirectly connected in a rotationally fixed manner to the input E of the transmission unit or is formed by same. The second and third shafts 14, 15 are at least indirectly connected to the input 7 and to the output 8 of the flexible drive transmission 6. The second shaft 14 is connected to a first disk system 33 of the flexible drive transmission 6 which, depending on the direction of power transmission, functions as an input 7 or as an output 8', whereas the third shaft 15 is connected to a second disk system 35 of the flexible drive transmission 6 which, depending on the functional assignment, functions as an output 8 or as an input 7'. The function of the individual disk systems 33, 35, i.e., the direction of power transmission via the flexible drive transmission 6, may be changed. Therefore, in a first operating state the input is denoted by reference numeral 7 at the first disk system 33 and the output is denoted by reference numeral 8 at the second disk system 35, whereas when the direction of power transmission is changed the input at the second disk system 35 is denoted by 7' and the output at the first disk system 33 is denoted by 8'. The first shaft 13 of the three-shaft planetary gear 11 is formed by the internal gear 24, the second shaft 14 is formed by the sun wheel 25, and the third shaft 15 is formed by the bridge 23. In the illustrated case the configuration between transmission input E and output A, in particular between transmission input E and the internal gear 24, is coaxial. The bridge 23 is connected to the second disk system 35 via a rotational speed/torque converter unit or a connecting gear 39, which preferably is designed as a simple spur gear set. The spur gear set includes a first spur gear 29 and a second spur gear 30, the first spur gear 29 being coupled in a rotationally fixed manner to the bridge 23 of the three-shaft planetary gear 11. The second spur gear 30 is connected in a rotationally fixed manner to the second disk system 35 of the flexible drive transmission 6. An additional connecting gear 40 designed as a spur gear set which forms a gear ratio stage 20 serves as the coupling between the second shaft 14, in the form of the sun wheel 25 of the planetary gear 11, and the first disk system 33. In the simplest case the first disk system also includes two spur gears, a first spur gear 37 and a second spur gear 38, the first spur gear 37 being connected in a rotationally fixed manner to the second shaft 14 in the form of the sun wheel 25 of the planetary gear 11, and intermeshing with the spur gear 38 which is connected in a rotationally fixed manner to the first disk system 33. The design of the two connecting gears 39, 40 as spur gear sets in the form described represents one possible design. Other designs are also possible. However, this design is characterized by the lowest number of components. The two connecting gears 39, 40 in each case form a gear ratio stage 19, 20, respectively, from the planetary gear 11 to the individual disk systems 33 or 35 of the flexible drive transmission 6. The two gear ratio stages 19, 20 have a fixed gear ratio. Both have the same number of mutually engaged spur gears, i.e., depending on the selection, either an even number or an odd number. Thus, by use of these gear ratio stages either the same rotational direction or a reversed rotational direction relative to the shafts of the planetary gear 11 coupled thereto may be achieved. The superposition gear 9 and the inputs of connecting gears 39, 40 coupled thereto have a coaxial configuration. The design is implemented by use of passages and hollow shafts.

The planetary gear 11 is designed in such a way that it has planet wheels 47 and 48 which in each case intermesh in pairs between the sun wheel 25 and the internal gear 24, in each case planet wheels 47.1 and 48.1 intermeshing and forming a planet wheel pair 46.1. Depending on the number n of planet wheel pairs selected, these are denoted by reference numeral 46.*n*. The first planet wheel, for example 47.1, intermeshes with the planet wheel 48.1 of the planet wheel pair 46.1 and with the sun wheel 18, whereas the second planet wheel 48.1 of the planet wheel pair 46.1 intermeshes with the first planet wheel 47.1 and with the internal gear 24. These pairs of intermeshing planet wheels 47.*n* and 48.*n*, forming the planet wheel pair 46.*n* where n>1, preferably have identical designs; i.e., a planet wheel pair 46.*n* preferably has a gear ratio of 1:1. Other gear ratios are also possible, for example 1:0.8 to 1:1.2. The design of the provided gear ratio stages 19, 20 between the planetary gear 11 and the continuously variable transmission 5 is provided corresponding to the maximum allowable rotational speed at the CVT. For the planetary gear 11, gear ratios between the internal gear 24 and the sun wheel 25 are selected to be 1:2.5 to 1:3.5, preferably 1:3, as a function of the spread of the continuously variable transmission.

The third shaft 15 in the form of the bridge 23 may also be at least indirectly connected to transmission output A. Thus, when power is transmitted via the flexible drive transmission 6 from transmission input E via the planetary gear 11 and the connecting gear 40 to the flexible drive transmission 6, from disk system 33 to disk system 35 via the bridge a coupling is provided with transmission output A via the connecting gear 39. When power is transmitted via the flexible drive transmission 6 in the direction from disk system 35 to the first disk system 33, either a coupling occurs with transmission output A via the planetary gear 11, in particular from the sun wheel 25 on the bridge 23, or, when the rotational speeds are equal, a direct coupling is provided via the spur gear 37 of the connecting gear 20 at least indirectly to output A via the second superposition gear 10, which is designed as a planetary gear 12. The planetary gear 12 is likewise designed as a three-shaft planetary gear including a first shaft 16, a second shaft 17, and a third shaft 18. These shafts may be at least indirectly connected via shiftable clutches 21 and 22 to the first superposition gear 9 in the form of the planetary gear 11, forming a four-shaft planetary gear. The first shaft 16 is formed by the bridge 26, the second shaft 17 is formed by the internal gear 28, and the third shaft 18 is formed by the sun wheel 27.

The second shaft 17 is connected in a rotationally fixed manner to output A. The second shaft 17 is also connected via the clutch unit 22 to the continuously variable transmission via the connecting gear 40, and is also connected to the second shaft of the first planetary gear 11. The first shaft 16 of the second superposition gear 10 may be connected in a rotationally fixed manner to the third shaft 15 of the planetary gear 11, in particular to the bridge 23, via the additional clutch 21. The shiftable clutch 21 is used to couple the planetary gear 12 to the first planet wheel set 11, in this case a four-shaft planetary gear being formed from the two three-shaft planetary gears 11, 12 when the clutch 21 is engaged.

The shiftable clutch 22 is provided between the second shaft 14 of the first planetary gear 11 and the second shaft 17, which is designed as an internal gear 28 of the planetary gear 12. As the result of the coupling of the second shaft 14 of the first planetary gear 11 to the third shaft 18 in the form of the sun wheel 27 of the planetary gear 12, this shiftable clutch 22 allows a rigid coupling between the sun wheel 27 and the internal gear 28 of the planetary gear 12, i.e., between the second and third shafts, and thus enables the connection of the second shaft 14 of the first planetary gear 11 to the internal gear 28 which is coupled in a rotationally fixed manner to transmission output A. In this case the output is provided, in a manner of speaking, directly by the second shaft 14 on transmission output A without further step-up.

Both shiftable clutches 21 and 22 may be selectively actuated. The shiftable clutch 22 is used for the coupling between transmission output A and the second shaft 14 of the first planetary gear 11, and the additional clutch 21 provides the rotationally fixed connection of the bridge 15, via the second planetary gear 12, to transmission output A. The shifting is optionally performed as needed. When the individual elements of the planetary gear are synchronous, both elements are preferably actuated in an overlapping manner so that the second and third shafts 14 and 15 operate synchronously. The shiftable clutches may be friction clutches. However, synchronously shiftable clutches are preferably used.

The continuously variable transmission 5, as previously described, is designed as a flexible drive transmission including two disk systems, a first disk system 33 and a second disk system 35, which are connected to one another in a force-transmitting manner via a traction way 34. Depending on the direction of power transmission, the first disk system 33 functions as an input 7, and disk system 35 functions as an output 8, or, when the function of the input is assigned to the third shaft 15, functions as an output 8'. In the latter case the respective other disk system, in this instance disk system 35, forms input 7'. In a first operating range the clutch 21 is engaged. In this case there is a connection between transmission input E and the first shaft 13 in the form of the internal gear 24 of the planetary gear 11. The power flow is transmitted via the first shaft 13 of the planetary gear 11 to the second shaft 14 in the form of the sun wheel 25. Disk system 33 is driven via the connecting gear 40 and the gear ratio stage 20 formed thereby, and disk system 35 is driven via the traction way 34. The effect via the gear ratio stage 19, which is formed by the connecting gear 39 or its output in the form of the spur gear 29 connected in a rotationally fixed manner to the bridge 23 of the planetary gear 11, results on account of the coupling via the clutch 21 to the second planetary gear 12, in particular the gear ratio, present at that location, of the rotational speed at output A. The rotational speed may be varied corresponding to the displacement at the individual disk systems 33 and 35. The input of the continuously variable transmission 5 is thus no longer directly coupled to the rotational speed of the drive motor, i.e., the rotational speed at transmission input E.

The rotational speed at transmission output A may be changed by controlling the continuously variable transmission 5 and also via the planetary gear 12. The direction of power transmission changes when the clutch is changed from disk system 33 to 35, or from 35 to 33, or from 7 to 8, or from 8 to 7.

When there is synchronism between the internal gear 28 and the sun wheel 27, and thus between the shafts connected thereto, clutch 21 is disengaged and clutch 22 is engaged. In this position as well, the entire operating range of the CVT may be traversed twice, i.e., depending on the position of the disks of disk systems 33 and 35 relative to one another and the direction of power transmission from 33 to 35 or from 35 to 33.

The coupling between the individual disk systems 33 and 35 of the continuously variable transmission 5 and the superposition gear 9 in the form of the planetary gear 11 results, as previously described, via the connecting gear 39, 40 in the form of gear ratio stages 19, 20, which are formed by rotational speed/torque converter units. In the design as a positive-fit flexible drive transmission 6, the way 31 for controlling the gear ratios at disk systems 33, 35 includes a way for displacing the two disk systems 33 and 35, whereby the distance between the disks of a disk system may be varied by way of the drive force at the disks, and this variable is used as a direct control variable or a variable which at least indirectly characterizes same, and a corresponding actuating device for varying the drive force, i.e., actuating devices for impinging on the individual disks or displacing same. The disks may be operated electrohydraulically, for example, or by other ways. A corresponding actuating device may be associated with either one disk system 33, 35, or preferably with both. In the first-referenced option, corresponding ways are provided for automatic setting or adaptation. Another possibility lies in actuating both disk systems 33, 35. With regard to the specific design itself, numerous possibilities are well known from the prior art which will not be addressed here in detail. This also applies to the actuation methods themselves, as well as specification of the control, regulation, and/or reference variables for operation of the flexible drive transmission 6, as well as incorporation of same into existing drive designs. There are also numerous possibilities for the design of the continuously variable transmission 5. The coupling of the two disk systems 33 and 35 and the transmission of force occur in each case via traction way 34, for example in the form of belts, chains, or a push belt, in such cases the design of the disks with regard to the positive-fit and form-fit transmission of force being correspondingly adapted, and the disk systems in a manner of speaking assuming the function of carrier elements.

As previously described, when the clutch 21 is engaged power is transmitted from transmission input E to the planetary gear 11, via the sun wheel 25 to the connecting gear 40, and from there to the flexible drive transmission 6, the connecting gear 39, and via the reaction thereof to the planetary gear 11, in particular the bridge 23, and via the planetary gear 12 to transmission output A. When the disk system is displaced so as to change the direction of power transmission from the second to the first disk system for transmitting power from the first to the second disk system, the power is transmitted, in a manner of speaking, from transmission input E, to the bridge 23 via the connecting gear 39 to disk system 35, and from there via the traction way 34 to disk system 33, the connecting gear 40, and then, depending on the shifting of clutches 21 or 22, via the planetary gear 12 to transmission output A. The entire operating range of the continuously variable transmission is thus traversed twice in a manner of speaking, each time in different directions. Depending on the clutch 21 or 22 that is shifted, in each case in the individual operating ranges which are characterized by the shifting of a clutch, the power transmission ranges traverse the flexible drive transmission in both directions, whereby operation above the zero level is possible.

The connecting gear 19, 20 is designed as follows, for example:

for 19: 1:1 to 0.5:1
for 20: 1:2 to 1:1.

According to one particularly advantageous embodiment, means 41 are provided for adapting the rotational speed of the traction way 34 to the rotational speed of transmission input E, i.e., for slip-free coupling of the traction way to the rotational speed of the transmission input. These ways include a transmitting element 42 which is at least indirectly coupled to transmission input E and is in a positive-fit mechanical linkage with the traction way 34. The traction way 34 is provided at the outer periphery 43 with profiling 44 which engages with correspondingly designed profiling 45 at the outer periphery 49 of the transmitting element 42. Another possibility is to design the traction way 34 as a chain or as a combination of a belt and chain, in which case the transmitting element is designed as a sprocket wheel; i.e., the design consistently results from the unchanged positioning of the transmitting element relative to the traction way 34. According to a first approach, adjustments to the traction way upon changes in the operating radius when the disks of the continuously variable transmission are displaced, as well as synchronous adaptation of the rotational speed of the traction way to the rotational speed of the transmission input, are compensated for by use of a clamping device, in particular a tensioning roller. The tensioning roller may be swiveled relative to the traction way and stationarily supported. The transmitting element is at least indirectly coupled to the transmission input. This means that the transmitting element is either coupled in a rotationally fixed manner to transmission input E or is coupled thereto via additional transmitting elements. To ensure rotation of the transmitting element in the same rotational direction as the operating direction of the traction way, the traction way is either directly coupled in a rotationally fixed manner to the drive shaft or transmission input, or is coupled via additional transmitting elements such as a spur gear set, in which case the number of intermeshing transmitting elements is odd.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

LIST OF REFERENCE NUMERALS

1 Transmission unit
2 Multirange transmission
3 First power branch
4 Second power branch
5 Continuously variable transmission
6 Flexible drive transmission
7 Input of the continuously variable transmission
8 Output of the continuously variable transmission
9 First superposition gear
10 Second superposition gear
11 Three-shaft planetary gear
12 Three-shaft planetary gear
13 First shaft
14 Second shaft
15 Third shaft
16 First shaft
17 Second shaft
18 Third shaft
19 Gear ratio stage
20 Gear ratio stage
21 First shiftable clutch
22 Second shiftable clutch
23 Bridge of planetary gear 11
24 Internal gear of planetary gear 11
25 Sun wheel of planetary gear 11
26 Bridge of planetary gear 12
27 Sun wheel of planetary gear 12
28 Internal gear of planetary gear 12
29 First spur gear
30 Second spur gear
31 Way for controlling the gear ratio
32 Shaft
33 First disk system
34 Traction way
35 Second disk system
36 Spur gear set
37 First spur gear
38 Second spur gear
39 Connecting gear
40 Connecting gear
41 Way
42 Transmitting element
43 Outer peripheral traction way
44 Profiling
45 Profiling
46.1, 46.n Planet wheel pair
47 Planet wheel
48 Planet wheel
49 Outer peripheral transmitting element
50 Intermediate gear stage
E Input
A Output

What is claimed is:

1. A transmission unit, comprising:
a transmission input;
a transmission output;
a first superposition gear;
a second superposition gear, each of said first and second superposition gears formed as a three-shaft planetary gear and including a first shaft, a second shaft, a third shaft, a sun wheel, an internal gear, a bridge, a plurality of planet wheels, said first, second, and third shafts of each of said first and second superposition gears each being formed respectively by a corresponding one of said sun wheel, said internal gear, said bridge, said plurality of planet wheels, and a plurality of elements connected thereto in a rotationally fixed manner, said first shaft of said first superposition gear being at least indirectly connected in a rotationally fixed manner to said transmission input, said second shaft of said first superposition gear and said second shaft of said second superposition gear being at least indirectly connected in a rotationally fixed manner to said transmission output;
a continuously variable transmission formed as a flexible drive transmission, said transmission input being connected to, and being capable of being connected to, said continuously variable transmission only by way of said first superposition gear, in all operating ranges said transmission input and said continuously variable transmission having no direct rotationally fixed connection therebetween;

a device for controlling a gear ratio at said flexible drive transmission;

a first connecting gear;

a second connecting gear, said first superposition gear being coupled with said continuously variable transmission via said first connecting gear, said second superposition gear being coupled with said continuously variable transmission via said second connecting gear, said first and second connecting gears each including a gear ratio stage, said third shaft of said first superposition gear being connected to said continuously variable transmission via said first connecting gear, said third shaft of said second superposition gear being connected to said continuously variable transmission via said second connecting gear;

a first shiftable clutch; and a second shiftable clutch, said second shaft of said first superposition gear and said third shaft of said second superposition gear being connected to said transmission output via said first shiftable clutch, said second shaft of said first superposition gear being connected in a rotationally fixed manner to said third shaft of said second superposition gear, said first shaft of said second superposition gear being connected to said third shaft of said first superposition gear via said second shiftable clutch.

2. The transmission unit according to claim 1, wherein said transmission input and said transmission output have an eccentric configuration, said three-shaft planetary gear of said first superposition gear being a single planetary gear having said plurality of planet wheels of said first superposition gear between said sun wheel of said first superposition gear and said internal gear of said first superposition gear.

3. The transmission unit according to claim 2, wherein said three-shaft planetary gear of said first superposition gear is a first planetary gear and said three-shaft planetary gear of said second superposition gear is a second planetary gear, said first shaft of said first superposition gear and said first shaft of said second superposition gear are each formed by one of a) said bridge of said first planetary gear and said bridge of said second planetary gear, respectively, and b) said plurality of elements coupled thereto in said rotationally fixed manner, said second shaft of said first superposition gear being formed by said sun wheel of said first planetary gear, said second shaft of said second superposition gear being formed by said internal gear of said second superposition gear, said third shaft of said first superposition gear being formed one of by said internal gear of said first planetary gear and by at least one of said plurality of elements coupled thereto in said rotationally fixed manner, said third shaft of said second planetary gear being formed one of by said sun wheel and by at least one of said plurality of elements coupled thereto in said rotationally fixed manner.

4. The transmission unit according to claim 2, wherein said first and second connecting gears are each formed by a reversing gear.

5. The transmission unit according to claim 4, wherein said first and second connecting gears are each formed by a spur gear stage including an even number of intermeshing spur gears.

6. The transmission unit according to claim 5, wherein at least one of a) one of said intermeshing spur gears of said first connecting gear one of (i) is formed by said third shaft of said first superposition gear and (ii) forms a structural unit with said third shaft of said first superposition gear, and b) one of said intermeshing spur gears of said second connecting gear one of (i) is formed by said third shaft of said second superposition gear and (ii) forms a structural unit with said third shaft of said second superposition gear.

7. The transmission unit according to claim 2, wherein said sun wheel of said second superposition gear is provided as a function of an overall transmission spread to be achieved.

8. The transmission unit according to claim 2, wherein said first superposition gear is designed with said gear ratio of said continuously variable transmission, which corresponds to a maximum theoretically possible said gear ratio at said continuously variable transmission.

9. The transmission unit according to claim 2, wherein said sun wheel of said first superposition gear has a reference circle diameter that is from 2 to 3 times smaller than that of said internal gear of said first superposition gear.

10. The transmission unit according to claim 2, wherein said sun wheel of said first superposition gear has a reference circle diameter that is from 2 to 2.6 times smaller than that of said internal gear of said first superposition gear.

11. The transmission unit according to claim 2, wherein said sun wheel of said second superposition gear has a reference circle diameter that is from 2 to 3 times smaller than that of said internal gear of said second superposition gear.

12. The transmission unit according to claim 2, wherein said sun wheel of said second superposition gear has a reference circle diameter that is from 2 to 2.6 times smaller than that of said internal gear of said second superposition gear.

13. The transmission unit according to claim 1, further including a hollow shaft, wherein said three-shaft planetary gear of said first superposition gear is a first planetary gear and said three-shaft planetary gear of said second superposition gear is a second planetary gear, said sun wheel of said first planetary gear and said sun wheel of said second planetary gear being connected to one another in a rotationally fixed manner via said hollow shaft.

14. The transmission unit according to claim 2, wherein said first connecting gear includes a first spur gear which is formed by said internal gear of said first superposition gear, said second connecting gear being formed by a second spur gear that is coupled in a rotationally fixed manner to said third shaft of said second superposition gear and by a third spur gear that is coupled in a rotationally fixed manner to said continuously variable transmission.

15. The transmission unit according to claim 1, wherein a gear ratio of 1:2 to 3 is set between said third shaft of said first superposition gear and said third shaft of said second superposition gear.

16. The transmission unit according to claim 1, wherein a gear ratio of 1:2.5 is set between said third shaft of said first superposition gear and said third shaft of said second superposition gear.

17. The transmission unit according to claim 1, wherein said three-shaft planetary gear of said first superposition gear is a first planetary gear and said three-shaft planetary gear of said second superposition gear is a second planetary gear, said plurality of planet wheels of said first superposition gear including a planet wheel pair, said sun wheel of said first superposition gear and said internal gear of said first superposition gear being coupled to one another via said planet wheel pair, said second superposition gear being positioned downstream from said first superposition gear in an axial direction, said second shaft of said second superposition gear being connected in a rotationally fixed manner to said transmission output, said first shaft of said second superposition gear being configured for being connected in a rotationally fixed manner to said third shaft of said first planetary gear, said first shiftable clutch being positioned between said second shaft of said first planetary gear and said second shaft of said second planetary gear, said second shiftable clutch being positioned between said third shaft of said first planetary gear and said first shaft of said second superposition gear.

18. The transmission unit according to claim 17, wherein said first shaft of said first planetary gear is formed by said internal gear of said first superposition gear, said second shaft of said first planetary gear is formed by said sun wheel of said first superposition gear, and said third shaft of said first planetary gear is formed by said bridge of said first superposition gear.

19. The transmission unit according to claim 17, wherein said first shaft of said second superposition gear is formed by said bridge of said second superposition gear, said second shaft of said second superposition gear is formed by said internal gear of said second superposition gear, and said third shaft of said second superposition gear is formed by said sun wheel of said second superposition gear.

20. The transmission unit according to claim 17, wherein said transmission input, said transmission output, and said first and second superposition gears are coaxial relative to one another.

21. The transmission unit according to claim 1, further comprising a traction device and a device configured for adapting a rotational speed of said traction device to a rotational speed of said transmission input, said continuously variable transmission being a positive-fit said flexible drive transmission, said traction device being formed by one of a belt, a chain, and a push belt.

22. The transmission unit according to claim 21, wherein said device configured for adapting said rotational speed of said traction device to said rotational speed of said transmission input includes a transmitting element which is at least indirectly coupled to said transmission input and which is in a positive-fit mechanical linkage with said traction device.

23. The transmission unit according to claim 22, wherein said traction device includes an outer periphery and a circumferential profiling at said outer periphery of said traction device, said transmitting element including an outer periphery and a profiling at said outer periphery of said transmitting element, said circumferential profiling of said traction device engaging with corresponding said profiling at said outer periphery of said transmitting element.

24. The transmission unit according to claim 23, further comprising a swivel gear, wherein said continuously variable transmission includes two disk systems, said transmission input includes a transmission input shaft, said transmitting element is configured in parallel with said transmission input shaft, and, for maintaining a tension in said traction device, said swivel gear is configured for swiveling said disk systems which are associated with said transmitting element.

25. The transmission unit according to claim 23, further comprising a clamping device, wherein said transmitting element is configured in parallel with said transmission input shaft, and, for maintaining a tension, said clamping device, which is supported so as to be one of displaceable and pivotable, is associated with said traction device.

26. The transmission unit according to claim 1, wherein said continuously variable transmission includes two disk systems each including a plurality of disks, said device for controlling said gear ratio at said flexible drive transmission including a plurality of actuators for adjusting a distance between respective ones of said plurality of disks of said disk systems.

27. The transmission unit according to claim 1, wherein said first and second connecting gears form a device for reversing a rotational direction.

\* \* \* \* \*

UNITED STATES PATENT AND TRADEMARK OFFICE
CERTIFICATE OF CORRECTION

PATENT NO. : 8,047,944 B2  
APPLICATION NO. : 12/616433  
DATED : November 1, 2011  
INVENTOR(S) : Dieter Glockler Page 1 of 1

It is certified that error appears in the above-identified patent and that said Letters Patent is hereby corrected as shown below:

COLUMN 12
  Between lines 59 and 60, please insert the following paragraph:
    --The transmitting element 42 is preferably connected in a rotationally fixed manner to transmission input E which functions as a drive shaft, and in conjunction with a clamping device allows synchronous adaptation of the rotational speed of the traction way to the rotational speed of the drive motor, i.e., transmission input E. Slip of the traction way is thus avoided. Also possible, however, are designs of the way for coupling the rotational speed to the rotational speed of the drive shaft by use of a plurality of mutually engaged transmitting elements, whereby a corresponding gear ratio must always be selected, preferably an odd number, to ensure the same rotational direction between the transmission input and the operating direction of the traction way. The engagement occurs on a continuous basis. The transmitting elements may also be provided so as to allow swiveling. In that case the transmitting elements are simultaneously used as a clamping element for adapting the rotational speed of the traction way to the transmission input.--

COLUMN 14
  At line 34, please delete "n>1", and substitute therefore --n≥1--.

COLUMN 15
  At line 3, please delete "transmission", and substitute therefore --transmission 5--.

Signed and Sealed this  
Thirteenth Day of November, 2012

David J. Kappos  
*Director of the United States Patent and Trademark Office*